United States Patent
Rajan et al.

[11] Patent Number: 6,136,188
[45] Date of Patent: Oct. 24, 2000

[54] WATER CAP WITH BUILT-IN FILTER AND AIR PUMP

[76] Inventors: Pasupathicoil R. Soundar Rajan, 17722 Manchester Ave., Irvine, Calif. 92614; Gary S. Hess, 27681 Alarcon, Mission Viejo, Calif. 92691

[21] Appl. No.: 09/176,833

[22] Filed: Oct. 22, 1998

[51] Int. Cl.[7] .................................................. B01D 35/26
[52] U.S. Cl. ...................... 210/244; 210/282; 210/416.3; 222/189.11; 222/321.7
[58] Field of Search ..................................... 210/282, 136, 210/244, 416.3, 446, 464, 466, 470; 222/189.06, 189.1, 189.11, 321.7

[56] References Cited

U.S. PATENT DOCUMENTS

| | | | |
|---|---|---|---|
| 2,781,312 | 2/1957 | Klumb et al. | 210/282 |
| 3,430,769 | 3/1969 | Sanzenbacher | 210/282 |
| 4,940,542 | 7/1990 | Simizu et al. | 210/321.8 |
| 5,094,363 | 3/1992 | Monahan et al. | 222/131 |
| 5,167,819 | 12/1992 | Iana et al. | 210/416.3 |
| 5,545,315 | 8/1996 | Lonneman | 210/120 |
| 5,733,448 | 3/1998 | Kaura | 210/282 |

*Primary Examiner*—David A. Simmons
*Assistant Examiner*—Frank M. Lawrence

[57] ABSTRACT

A new water cap with built-in filter and air pump for filtering unfiltered water within a container. The inventive device includes a filtering portion position interiorly of a container. The filtering portion includes an upper microscreen disposed within the open lower end of the conduit. An upper layer of foam is disposed below the upper microscreen. A filtering cartridge is disposed below the upper layer of foam. A lower layer of foam is disposed below the filtering cartridge. A lower microscreen is disposed below the lower layer of foam. An air pump is coupled with respect to the container. The air pump is in communication with an interior of the container. The air pump has a check valve and an adjustable or standard air flow valve in communication therewith.

7 Claims, 4 Drawing Sheets

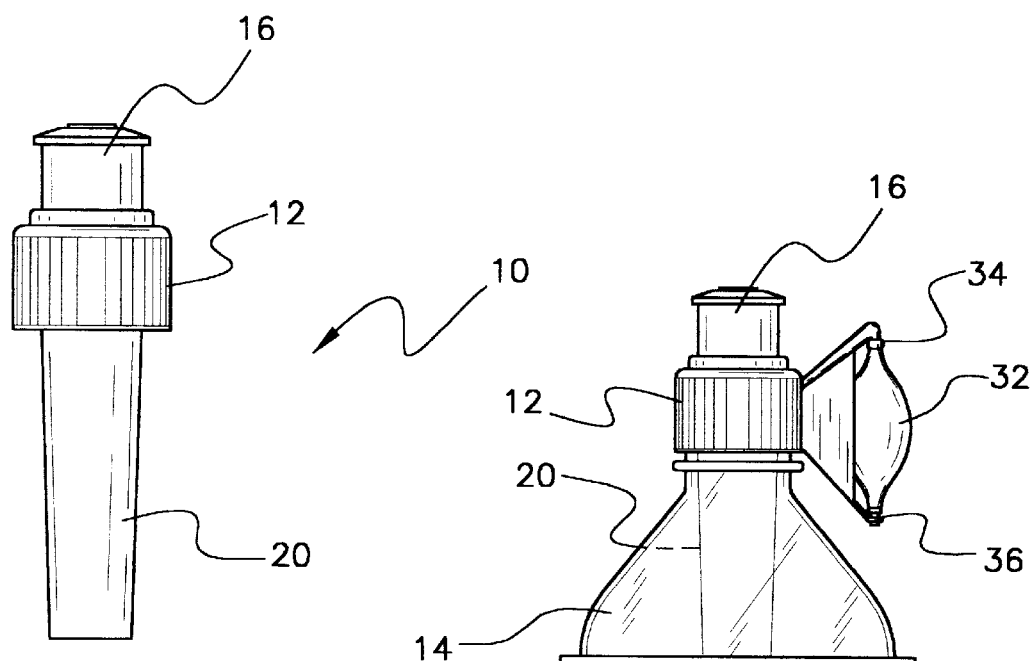
Fig.1
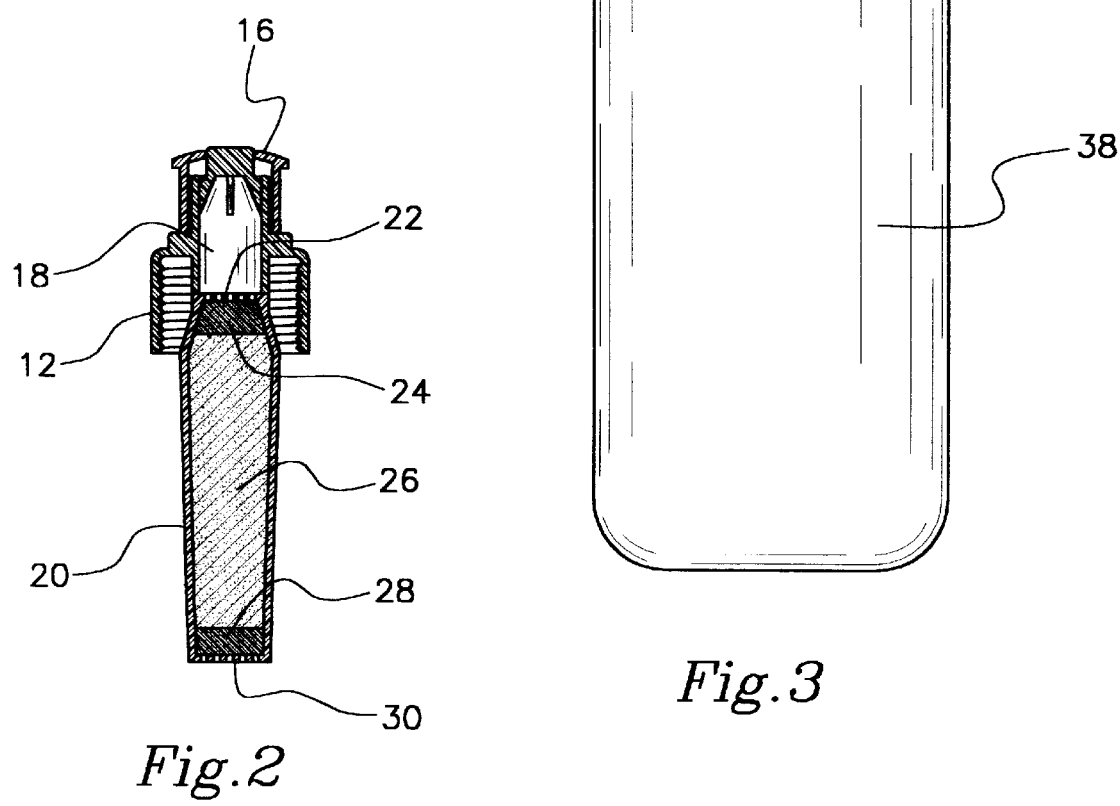
Fig.2
Fig.3

WATER CAP WITH BUILT-IN FILTER AND AIR PUMP

BACKGROUND OF THE INVENTION

1. Field of the Invention

The present invention relates to water containers and more particularly pertains to a new water cap with built-in filter and air pump for filtering tap water within a container.

2. Description of the Prior Art

The use of water containers is known in the prior art. More specifically, water containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art water containers include U. S. Pat. No. 5,122,272 to Iana et al.; U.S. Pat. No. 4,938,389 to Rossi et al.; U.S. Pat. No. 5,431,813 to Daniels; U.S. Pat. No. 5,076,922 to DeAre; U.S. Pat. No. 5,120,437 to Williams; and U.S. Pat. No. Des. 254,145 to Wilcock.

While these devices fulfill their respective, particular objectives and requirements, the aforementioned patents do not disclose a new water cap with built-in filter and air pump. The inventive device includes a filtering portion position interiorly of a container. The filtering portion includes an upper microscreen disposed within the open lower end of the conduit. An upper layer of foam is disposed below the upper microscreen. A filtering cartridge is disposed below the upper layer of foam. A lower layer of foam is disposed below the filtering cartridge. A lower microscreen is disposed below the lower layer of foam. An air pump is coupled with respect to the container. The air pump is in communication with an interior of the container to maintain pressure for smooth flow of filtered water to the user. The air pump has a check valve and an adjustable or standard air flow valve in communication therewith.

In these respects, the water cap with built-in filter and air pump according to the present invention substantially departs from the conventional concepts and designs of the prior art, and in so doing provides an apparatus primarily developed for the purpose of filtering tap water within a container or custom container.

SUMMARY OF THE INVENTION

In view of the foregoing disadvantages inherent in the known types of water containers now present in the prior art, the present invention provides a new water cap with built-in filter and air pump construction wherein the same can be utilized for filtering unfiltered water within a container. The air pump helps maintain the required pressure for smooth flow of filtered water to users.

The general purpose of the present invention, which will be described subsequently in greater detail, is to provide a new water cap with built-in filter and air pump apparatus and method which has many of the advantages of the water containers mentioned heretofore and many novel features that result in a new water cap with built-in filter and air pump which is not anticipated, rendered obvious, suggested, or even implied by any of the prior art water containers, either alone or in any combination thereof.

To attain this, the present invention generally comprises a cap portion having internal threads coupling with an externally threaded open upper end of a container. The cap portion has an extendable spout extending upwardly therefrom. The spout has a conduit disposed interiorly of the cap portion. An open lower end of the conduit has a filtering portion extending downwardly therefrom. The filtering portion includes an upper microscreen disposed within the open lower end of the conduit. An upper layer of foam is disposed below the upper microscreen. A filtering cartridge is disposed below the upper layer of foam. A lower layer of foam is disposed below the filtering cartridge. A lower microscreen is disposed below the lower layer of foam. An air pump is secured to the cap portion. The air pump is in communication with an interior of the container. The air pump has a check valve and an adjustable or standard air flow valve in communication therewith.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water cap with built-in filter and air pump apparatus and method which has many of the advantages of the water containers mentioned heretofore and many novel features that result in a new water cap with built-in filter and air pump which is not anticipated, rendered obvious, suggested, or even implied by any of the prior art water containers, either alone or in any combination thereof.

It is another object of the present invention to provide a new water cap with built-in filter and air pump which may be easily and efficiently manufactured and marketed.

It is a further object of the present invention to provide a new water cap with built-in filter and air pump which is of a durable and reliable construction.

An even further object of the present invention is to provide a new water cap with built-in filter and air pump which is susceptible of a low cost of manufacture with regard to both materials and labor, and which accordingly is then susceptible of low prices of sale to the consuming public, thereby making such water cap with built-in filter and air pump economically available to the buying public.

Still yet another object of the present invention is to provide a new water cap with built-in filter and air pump which provides in the apparatuses and methods of the prior art some of the advantages thereof, while simultaneously overcoming some of the disadvantages normally associated therewith.

Still another object of the present invention is to provide a new water cap with built-in filter and air pump for filtering unfiltered water within a container.

Yet another object of the present invention is to provide a new water cap with built-in filter and air pump which includes a filtering portion position interiorly of a container. The filtering portion includes an upper microscreen disposed within the open lower end of the conduit. An upper layer of foam is disposed below the upper microscreen. A filtering cartridge is disposed below the upper layer of foam. A lower layer of foam is disposed below the filtering cartridge. A lower microscreen is disposed below the lower layer of foam. An air pump is coupled with respect to the container. The air pump is in communication with an interior of the container. The air pump has a check valve and an adjustable or standard air flow valve in communication therewith. The air pump provides pressure within the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new water cap with built-in filter according to the present invention.

FIG. 2 is a cross-sectional side view of the present invention.

FIG. 3 is a side view of the present invention in place on a container with an air pump.

DESCRIPTION OF THE PREFERRED EMBODIMENT

Figures 4, 5:
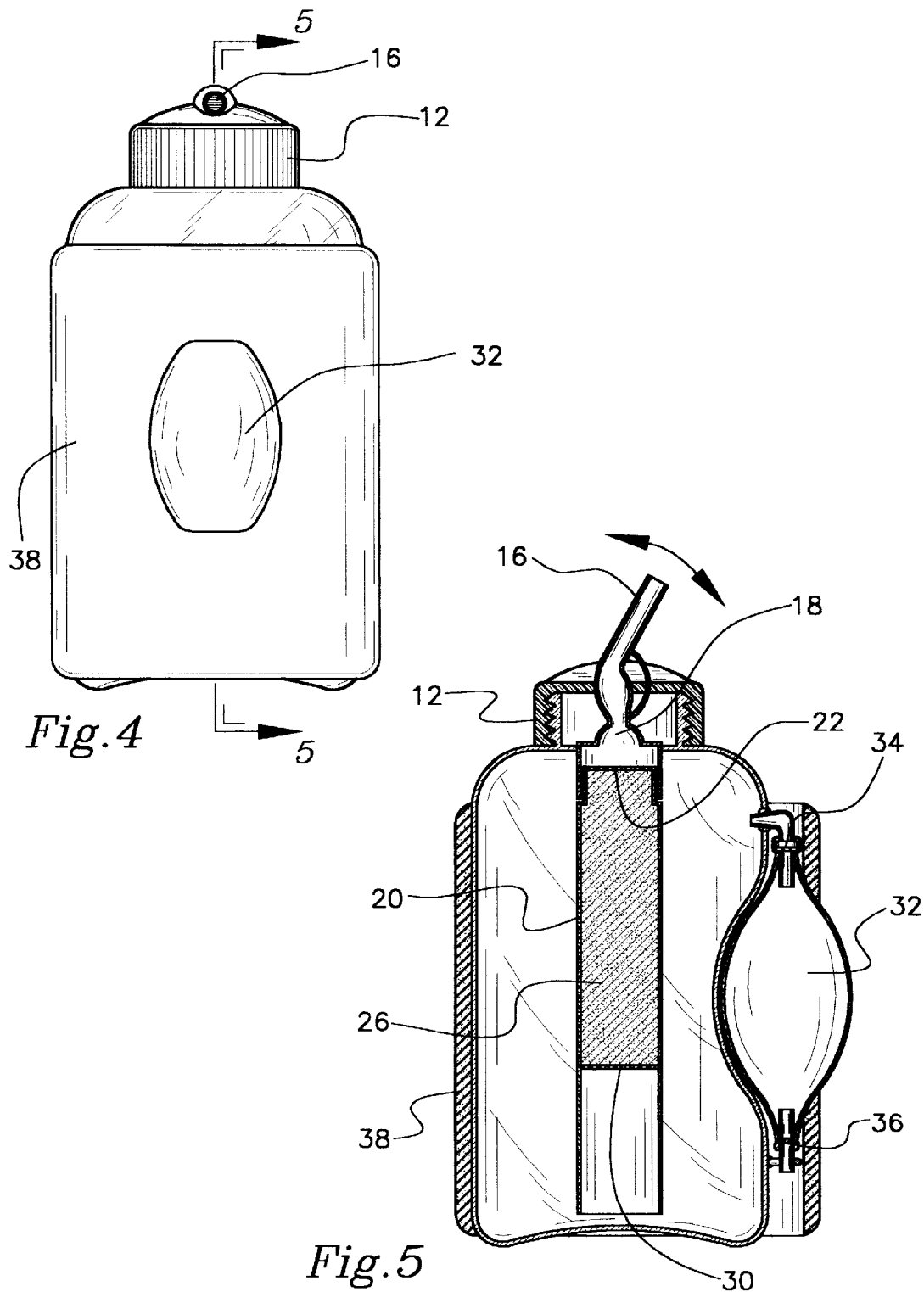
FIG. 4 is a front view of a second embodiment of the present invention.
FIG. 5 is a cross-sectional view of the second embodiment of the present invention as taken along line 5—5 of FIG. 4.

With reference now to the drawings, and in particular to FIGS. 1 through 7 thereof, a new water cap with built-in filter and air pump embodying the principles and concepts of the present invention and generally designated by the reference numeral 10 will be described.

As best illustrated in FIGS. 1 through 7, the water cap with built-in filter 10 comprises a cap portion 12 having internal threads coupling with an externally threaded open upper end of a container 14, such as a sports bottle. The cap portion 12 has an extendable spout 16 extending upwardly therefrom. The spout 16 has a conduit 18 disposed interiorly of the cap portion 12. An open lower end of the conduit 18 has a filtering portion 20 extending downwardly therefrom. The filtering portion 20 includes an upper microscreen 22 disposed within the open lower end of the conduit 18. An upper layer of foam 24 is disposed below the upper microscreen 22. A filtering cartridge 26 is disposed below the upper layer 24 of foam. A lower layer of foam 28 is disposed below the filtering cartridge 26. A lower microscreen 30 is disposed below the lower layer of foam 28. Ideally, the filtering cartridge 26 or the entire filtering portion 20 is replaceable.

An air pump 32 is secured to the cap portion 12. The air pump 32 is in communication with an interior of the container 14. The air pump 32 has a check valve 34 and an adjustable or standard air flow valve 36 in communication therewith. The air pump 32 adds pressure inside the container to push the unfiltered water inside the container to force it through the filtering portion 20 and assure smooth flow of filtered water through the spout to the user. The container 14 may be disposed within a foam insulation sleeve 38. The sleeve may have a strap attachment (not shown) coupled to it to which a strap (not shown) may be attached.

Figure 6:
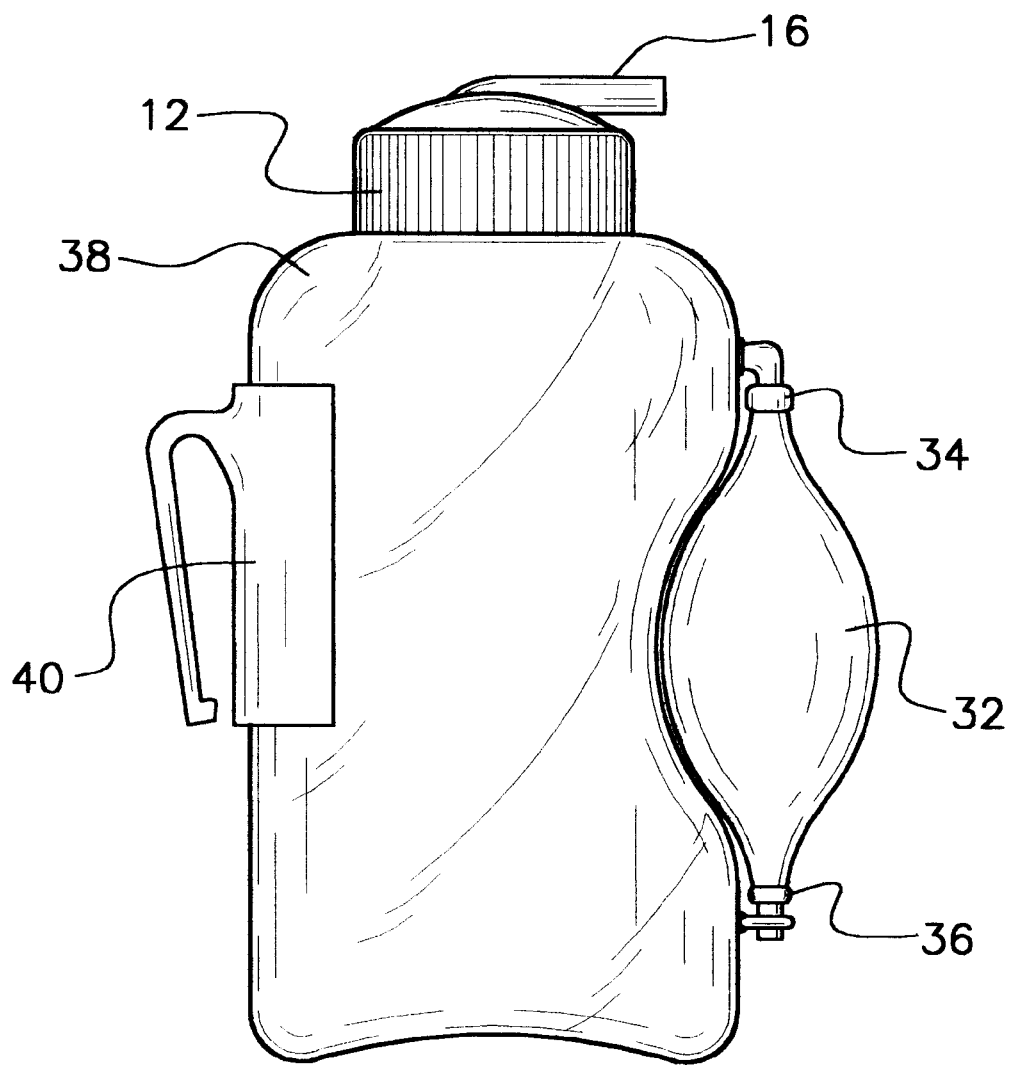
FIG. 6 is a front view of the second embodiment of the present invention.

In a second embodiment, as illustrated in FIGS. 4–6, the container is disposed within a foam insulating sleeve 38. A belt attachment clip 40 is secured to the foam insulating sleeve 38. The container 14 having the filtering portion 20 extending essentially an entire length of an interior of the container 14. The filtering portion 20 may be either single or multistage. Ideally, the filtering cartridge 26 or the entire filtering portion 20 is also replaceable. Note FIG. 5.

Figure 7:
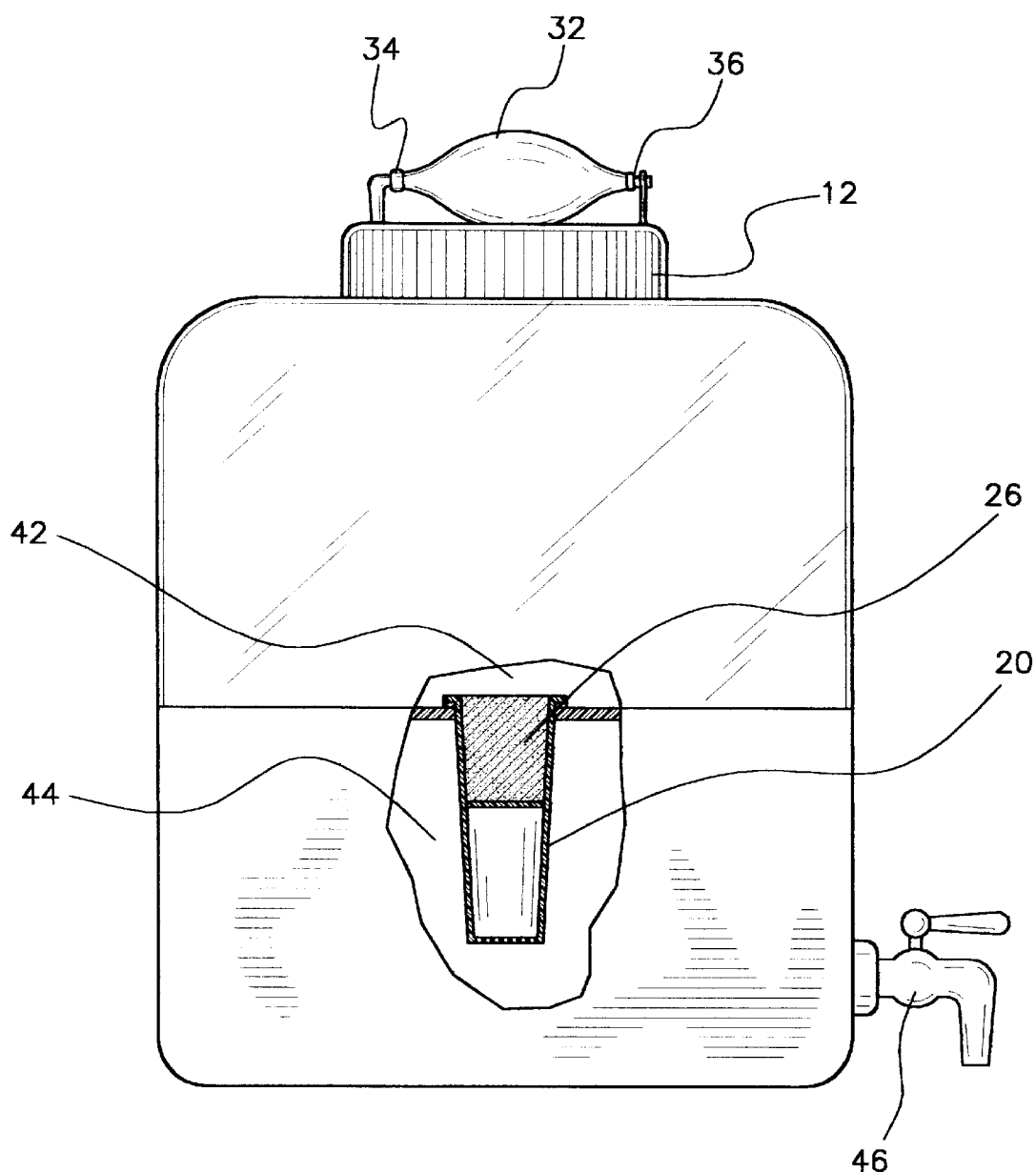
FIG. 7 is a side view of a third embodiment of the present invention.

In a third embodiment, as illustrated in FIG. 7, the container is divided into an upper section 42 and a lower section 44. The filtering portion 20 is disposed between the upper section 42 and the lower section 44. The upper section 42 receiving unfiltered water therein through a removable cap 12. The removable cap 12 has the air pump 32 disposed thereon. The lower section 44 has a dispensing spout 46 in communication therewith for dispensing water after it has passed through the filtering portion 20. The filtering cartridge 26 in the filtering portion 20 may be either single or multistage. Ideally, the filtering cartridge 26 or the entire filtering portion 20 is also replaceable.

In use, the user would simply fill the container 14 with unfiltered water and use the air pump 32 to urge the water through the filtering portion 20 to be dispensed for drinking. As the water level inside the container 14 is reduced, the pressure inside is correspondingly reduced. The air pump 32 is squeezed to inject air into the container 14, thereby increasing the pressure within and forcing water continuously out.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. In combination:
a bottle with an interior and an open upper end;
a cap removably mounted on the open upper end of the bottle, the cap comprising:
  a cap portion having a recess for receiving the open upper end of the bottle, the cap portion having
    an extendable spout mounted on the cap portion for extending upwardly from the cap portion, and
    a conduit mounted on the cap portion in communication with the spout, the spout extending out of the recess of the cap portion and into the interior of the bottle, the conduit having an open lower end and a lumen with a filtering portion, the filtering portion including an upper microscreen disposed in the lumen, an upper layer of foam disposed below the upper microscreen in the lumen, a filtering cartridge disposed below the upper layer of foam in the lumen, a lower layer of foam disposed below the filtering cartridge in the lumen, and a lower microscreen disposed below the lower layer of foam in the lumen; and
an air pump assembly including an air pump in communication with the interior of the bottle, a check valve, and an air flow valve in communication with the air pump;
wherein the air pump assembly is mounted on the bottle;
wherein the air pump assembly is mounted on an exterior surface of a side wall of the bottle for permitting the squeezing of the air pump by a single hand of a user gripping the side wall of the bottle;
wherein a compressible foam sleeve is wrapped about the bottle and substantially surrounds a portion of the air pump assembly for securing the air pump assembly against the exterior surface of the side wall of the bottle.

2. The water cap with built-in filter and air pump as set forth in claim 1 and further including a belt attachment clip secured to the foam sleeve.

3. The water cap with built-in filter and air pump as set forth in claim 1 wherein the filtering cartridge is replaceable.

4. The combination of claim 1 wherein the side wall of the bottle has a depression for receiving a portion of the air pump assembly.

5. The combination of claim 1 wherein the air pump comprises a bulbous flexible bladder having the check valve in communication with a first opening of the bulbous flexible bladder and the air flow valve in communication with a second opening of the bulbous flexible bladder.

6. The combination of claim 5 wherein a tube is connected the first opening of the bulbous flexible bladder, and the tube is in communication with the interior of the bottle for providing air pumped by the air pump assembly to the interior of the bottle.

7. The combination of claim 1 wherein a portion of the air pump protrudes through a hole in the compressible foam sleeve.

\* \* \* \* \*